UNITED STATES PATENT OFFICE.

ALBERT G. CRAWFORD, OF CHICAGO, ILLINOIS, ASSIGNOR OF ONE-HALF TO HALLECK W. SEAMAN, OF CHICAGO, ILLINOIS.

REFRIGERANT AND PROCESS OF MAKING THE SAME.

1,325,667. Specification of Letters Patent. Patented Dec. 23, 1919.

No Drawing. Original application filed February 5, 1918, Serial No. 215,452. Divided and this application filed October 14, 1918. Serial No. 257,962.

*To all whom it may concern:*

Be it known that I, ALBERT G. CRAWFORD, a citizen of the United States, and a resident of the city of Chicago, in the county of Cook and State of Illinois, have invented certain new and useful Improvements in Refrigerants and Processes of Making the Same; and I do hereby declare that the following is a full, clear, and exact description of the same.

The ingredients now used for refrigeration, such as ammonia gas, sulfur dioxid and ethyl chlorid, are objectionable for the reason that they are not only corrosive to the pipes or receptacles in which they are used, but are also poisonous in case of leakage, and are therefore not very desirable for use commercially.

This invention pertains to a refrigerant made by the mixture of compounds belonging to either the paraffin or ethylene series said refrigerant having no corrosive effect upon pipes or receptacles in which it is placed, and furthermore, is non-poisonous, easily handled, and does not deteriorate, and this application is a division of my application filed February 5th, 1918, Serial No. 215,452.

It is an object of this invention to provide a refrigerant by mixing hydro-carbons of the paraffin or ethylene series in varying proportions and subjecting the resultant mixtures to different pressures whereby refrigerants having different boiling points are produced, depending upon the proportions of the ingredients and the pressure to which they are subjected.

The following is a full, clear and exact description of the ingredients and process of mixing the same to form a refrigerant covering the principles of this invention.

The refrigerant producing the most satisfactory results commercially is formed by mixing substances of the paraffin series, namely 80% of normal butane, $C_4H_{10}$, which has a boiling point of $+1°$ C., and 20% of propane, $C_3H_8$, the boiling point of which is $-45°$ C., and subjecting the mixture to a pressure of 45 pounds per square inch, the resultant mixture or refrigerant having a boiling point of $-10°$ C. By varying the proportions, using 45% of butane, and 55% of propane and subjecting the mixture to a pressure of 60 pounds per square inch, a refrigerant is produced having a boiling point of $-18°$ C. The above are examples of what different proportions of butane and propane will produce by subjecting the resultant mixtures to different pressures, for obtaining refrigerants having different boiling points.

Butane and propane are used since the same produce satisfactory results from a commercial standpoint, these hydro-carbons being readily obtained from casing-head gas in the petroleum industry. However, equally good results can be obtained from other hydro-carbons of the paraffin series in combination with butane and propane. Any substances such as ethane, $C_2H_6$, and pentane, $C_5H_{12}$, having low boiling points, can be used to get good results. Also, any one of these substances can be used with propane or butane. Similar results can also be obtained by using methane, $CH_4$, ordinarily known as marsh gas, but methane has not been used in practice because of its poisonous nature, but by mixing with other substances of the paraffin series, and subjecting the same to pressure, a good refrigerant can be obtained.

I do not care to confine myself entirely to the use of hydro-carbons of the paraffin series, as good results are obtained by using members of the ethylene series. For example, ethylene, $C_2H_4$, having a boiling point of $-103°$ C., can be mixed with other members of the paraffin or ethylene series, and by subjecting the mixture to pressure, a good refrigerant results. The boiling point of the mixtures can be controlled by the proportions of the ingredients and the pressure to which the mixtures are subjected. Propylene, $C_3H_6$, with a boiling point of $-50°$ C., is also commercially feasible to use on account of its easy manufacture. Butylene, $C_4H_8$, with a boiling point of $+1°$ C. and amylene, $C_5H_{10}$, with a boiling point of 36° C., can also be used in certain proportions of the substances, and subjecting the resultant mixture to pressure to obtain the desired refrigerant.

It will, of course, be understood that any of the hydro-carbon substances of the paraffin or ethylene series may be mixed in desired proportions and then subjected to pressure to form a refrigerant embodying the principles of this invention, and possessing commercial advantages over ammonia and other refrigerants at present in common use. I am furthermore aware that numerous other details of my invention may be varied through a wide range without departing from the principles thereof, and I therefore do not purpose limiting the patent granted otherwise than necessitated by the prior art.

I claim as my invention:

1. A refrigerant consisting of a gas of the ethylene series and propane mixed together so as to have a boiling temperature suitable for refrigeration and subjected to a liquefying pressure.

2. A refrigerant produced by subjecting a mixture of propane and another hydro-carbon to liquefying pressure.

3. A refrigerant consisting of a mixture of propane and another hydro-carbon subjected to a liquefying pressure, the combined mixture having a boiling point below $+1°$ C.

4. The process of forming a refrigerant by mixing a plurality of hydro-carbons of different series in proportions to afford a boiling temperature for the mixture suitable for refrigeration purposes, and subjecting the mixture to a liquefying pressure.

In testimony whereof I have hereunto subscribed my name in the presence of two subscribing witnesses.

ALBERT G. CRAWFORD.

Witnesses:
 LAWRENCE REIBSTEIN,
 EARL M. HARDINE.